Patented May 1, 1945

2,375,016

UNITED STATES PATENT OFFICE 2,375,016

MANUFACTURE OF NITRILES

Kenneth E. Marple and Theodore W. Evans, Oakland, and Bert Borders, San Francisco, Calif., assignors to Shell Development Company, San Francisco, Calif., a corporation of Delaware No Drawing. Application October 30, 1940,
Serial No. 363,494

19 Claims. (Cl. 260—464)

The invention relates to a process for the preparation of nitriles, and more particularly pertains to the conversion of unsaturated amines to the corresponding unsaturated nitriles. In one of its specific embodiments the invention is directed to conversion of unsaturated allyl type amines to the corresponding acrylo type nitriles.

Among the methods previously proposed for the preparation of acrylonitrile and of its homologues and analogues, reference may be made to dehydration of ethylene cyanohydrin and the like. Methacrylonitrile has also been prepared by the catalytic dehydrohalogenation of alpha-halogenated isobutyronitrile. Also, nitriles have been prepared by the action of hypohalites on the corresponding amines, or by the dehydration of the carboxylic acid salts of the corresponding amines in the presence of a dehydrating catalyst of the type of silica-gel, activated carbon, clays, etc. All of these processes are costly, cumbersome, uneconomical or present technical difficulties when applied to the commercial scale production of the nitriles.

It is therefore the main object of the present invention to provide a process which will avoid the above and other defects, and provide a novel and economical process for the technical manufacture of saturated and unsaturated nitriles. Another object is to provide a process for the production of high yields of nitriles from the corresponding amines. A further object is to provide a simple and economical process for the production of unsaturated nitriles, particularly of the type of acrylonitrile, from the corresponding allyl type amines. Still other objects will be apparent from the following disclosure of the present invention.

It has now been discovered that the above and other objects may be attained by subjecting the amines to catalytic oxidation. More specifically, it has been found that nitriles, and particularly unsaturated aliphatic nitriles, can be readily and economically prepared in high yields by subjecting the corresponding amines to catalytic oxidation in the presence of a hydrogen acceptor, such as oxygen which may be added in a pure state or as a mixture thereof with other gaseous materials as nitrogen, carbon dioxide, etc., such mixtures containing, for example, from 21.0% to 99.9% oxygen. It has been further discovered that this catalytic oxidation, in order to obtain high yields of the desired nitriles, should be preferably effected in the vapor phase and in the presence of inert diluents described more fully hereinbelow, particularly when unsaturated amines are to be converted to the corresponding nitriles.

The present invention is applicable to the catalytic oxidation of saturated and unsaturated amines containing the grouping

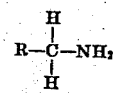

wherein R may be a substituted or unsubstituted alkyl, aryl, aralkyl, carbocyclic or heterocyclic group or radical. In other words, the organic compounds which may be oxidized to the corresponding nitriles or cyanides, contain an amino radical directly attached to a saturated carbon atom which is of primary character. Also, instead of employing a primary amine of the general formula described above, the process of the present invention is also applicable to the production of nitriles from the secondary and tertiary amines, i. e., organic compounds of the above-defined class wherein one or both hydrogen atoms of the amino radical (NH₂) have been substituted by a saturated or unsaturated alkyl, aryl, aralkyl or carbocyclic radical. Therefore, broadly stated, the present process is applicable to the production of nitriles from amines having at least one methylene group directly attached by a single bond to the nitrogen atom.

The invention is particularly adaptable for the catalytic oxidation of unsaturated amines containing an olefinic group having two hydrogen atoms on the carbon atom directly attached to the nitrogen atom. Of this class of unsaturated amines, the invention is especially concerned with effecting the oxidation of amines containing the grouping

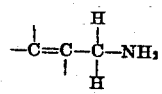

wherein the loose bonds may be taken up by hydrogen, and/or alkyl, aryl, aralkyl and/or alicyclic groups which may or may not be further substituted. As noted above, one or both hydrogen atoms of the amino radical may be substituted by hydrocarbon radicals. In other words, the compounds comprising these preferred groupings of unsaturated compounds may be generally defined as unsaturated amines containing an allyl group having two hydrogen atoms on the carbon atom directly attached to the nitrogen atom.

The following is a non-limiting, representative list of unsaturated allyl type amines which may be catalytically oxidized according to the process of the invention to produce the corresponding nitriles:

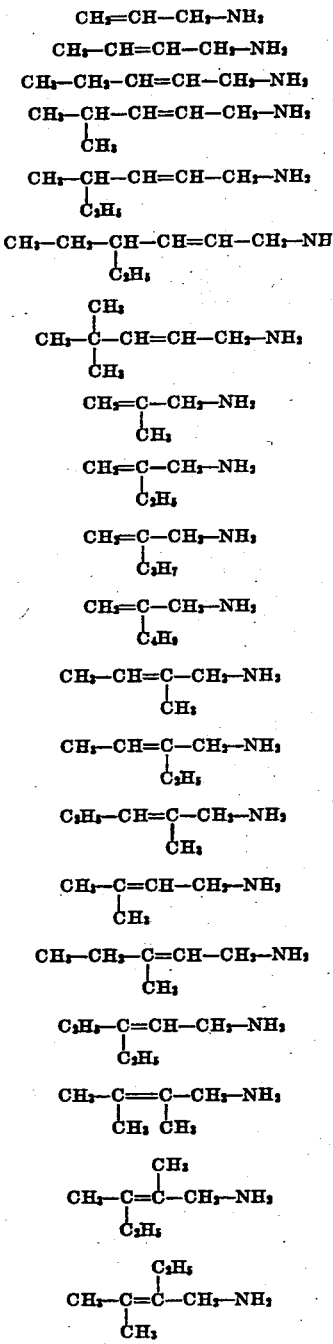

etc., and their homologues. Instead of the alkyl derivatives, the aryl and aralkyl derivatives may be resorted to, in which case the cyclic nuclei may be heterocyclic as well as carbocyclic. The corresponding saturated amines may be used to produce saturated nitriles.

Other suitable unsaturated non-vinyl type amines include secondary and tertiary allyl type amines, such as secondary allyl amine, tertiary allyl amine, secondary methallyl amine, secondary ethyl allyl amine, tertiary methallyl and ethyl allyl amines, etc., as well as primary, secondary and tertiary amines in which an olefinic linkage is disposed between carbon atoms which are further removed from the amino group than the unsaturated carbon atoms in allyl type amines.

Representative compounds of this group include

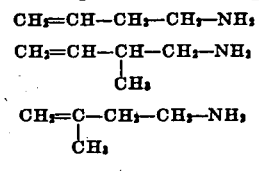
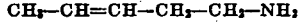

and the like, and their homologues, analogues, and suitable substitution products. Instead of employing the above amines individually, it is possible and even frequently advantageous to catalytically oxidize mixtures of two or more of the above or similar amines. For instance, mixtures of primary and secondary allyl or methallyl amines were oxidized according to the process of the present invention to produce good yields of acrylonitrile or methacrylonitrile, respectively. This is technically important since in the preparation of unsaturated primary amines, some secondary and/or tertiary amines are always formed. According to the present process, these mixtures may be directly oxidized to the corresponding unsaturated nitriles without the necessity of preliminarily fractionally separating the amines.

The catalytic oxidation according to the present process is effected preferably in the vapor phase by causing the amines of the defined class, and preferably the unsaturated amines, such as the allyl type amines, to react with oxygen in the presence of an oxidizing catalyst, e. g. silver or alloys thereof, at temperatures of between about 450° C. and 600° C. In order to avoid undesirable side reactions, the catalytic oxidation is preferably effected in the presence of inert gaseous or vaporous diluents so that, although substantially equimolecular quantities of the amine and oxygen are employed, the concentration of the amine in the vaporous mixture being subject to catalytic oxidation is less than 50% and preferably is between about 20% and 40% of the total mixture.

The catalyst employed in the execution of the process of the present invention may be an element or alloy of a metal or metalloid capable of acting as an oxidizing catalyst when employed in accordance with the principles embodied in this invention. The following are mentioned as examples of suitable catalysts: silver, copper, platinum, gold, cobalt, nickel, vanadium, aluminum, chromium, tin, tungsten, zinc, brass, gold-silver alloy, silver-copper, silver-zinc and silver-arsenic alloys, etc. Oxidizing catalysts containing a metal of the third period of the periodic table, such as titanium, vanadium, chromium, manganese, iron, cobalt, nickel, copper, zinc, arsenic and selenium were found to be suitable catalysts for the high temperature oxidation of unsaturated allyl type amines to the corresponding unsaturated nitriles. Also, it was found that copper and silver metals, and especially the latter, are particularly suitable catalysts for effecting the desired reaction. These catalysts are relatively inexpensive, are easily prepared and reactivated and are not readily susceptible to poisoning. Their catalytic activity, which is normally decreased with use, may be restored, for example, by amalgamating the surface and supplying heat to drive off the combined mercury, thus leaving an activated catalytic metal surface.

Although the particular catalyst selected for the catalytic oxidation can be prepared and used in a variety of ways, in the majority of cases it is preferable to use the catalysts which are of a compact metallic nature. For example, the metal or metalloid catalysts may be employed in the form of metal wire screens, turnings, granules, nails, chips and the like. In the case of the use of silver as the catalyst, excellent results have been obtained by employing silver mirrors, such as silver mirrors deposited on silicon carbide aggregate. The metallic surfaces of the catalysts may be activated by a variety of methods known to those skilled in the art. In order to increase the catalytic activity of the catalyst, it may be desirable in some cases to deposit the catalyst on various inert carriers. For example, instead of employing silicon carbide, the support material for silver may consist of elementary silicon in either the amorphous or crystalline state.

It is seen that the most desirable oxidation catalyst, in any case, is one which possesses a moderate initial activity, is substantially devoid of the tendency to induce side reactions such as polymerization, condensation, and the like, and possesses a freedom from deterioration as a result of sintering or poisoning.

The operation is, in the majority of cases, conducted in the vapor phase and in a temperature range of from 450° C. to 600° C., and preferably between about 500° C. and about 525° C., this temperature range being particularly suitable for the catalytic oxidation of the lower boiling homologues of the unsaturated allyl type amines, such as allyl amine, crotyl amine, methallyl amine and ethyl allyl amine. The use of temperatures below 450° C. may in some cases be impractical due to the relatively slow rate of reaction. The practical upper temperature limit is usually determined by the occurrence of pyrolytic side reactions, which usually occur when excessively high temperatures at the existing operating pressure are employed. The temperature selected for each specific operation is dependent, at least in part, on the stability and character of the amine reacted and also on the stability of the resulting nitrile as regards cracking, polymerization and resistance against further oxidation. Generally speaking, the saturated aliphatic amines permit the use of higher temperatures than the corresponding unsaturated amines. In fact, temperatures close to or above 600° C. may be necessary in some cases for the conversion of certain of the saturated amines to the corresponding nitriles. When it is desired to employ high space velocities, it is desirable and even essential to operate at temperatures which are in the vicinity of the upper limit of the allowable range. Conversely, when low space velocities are to be employed, it may be desirable to operate at temperatures which are near the lower limit of the range. The term "space velocity," as employed herein, may be defined as the unit volume of amines, such as the aforementioned unsaturated allyl type amines, flowing through the apparatus per unit volume of catalyst, under standard conditions of temperature and pressure.

The reaction may be effected by employing oxygen as the hydrogen acceptor. In the alternative, air and other gases containing free oxygen, or yielding oxygen under operating conditions, may be used. In order to obtain optimum yields of the desired nitriles, it is generally preferable to employ equimolecular quantities of the amine and of oxygen. When an oxygen-containing gas is employed, the amount of such gas should preferably be such that substantially equimolecular amounts of the amine and oxygen are introduced into and present in the reaction zone. In most cases, decidedly inferior yields are produced when the oxygen is supplied in less than equimolecular amounts with the amine. For example, whereas acrylonitrile was obtained in yields of about 85% and higher when equimolecular amounts of allyl amine and oxygen were reacted according to the present process, the use of about 0.7 of an equivalent of oxygen gave yields of only about 40%. In this connection, it must be noted that the oxygen-amine ratio in the oxidation of unsaturated amines of the type of methallyl amine is not as critical as in the case of the oxidation of allyl amine and the like. This is due to the fact that, under ordinary conditions of operation, the oxidation of allyl amine according to the present process requires the attainment of complete or substantially complete reaction since the allyl amine appears to react with the nitrile. Therefore, substantially no unreacted allyl amine is recovered, and the conversion thereof to acrylonitrile is equal to the yield. On the other hand, in the case of methallyl amine and similar unsaturated amines, the use of less than equivalent amounts of oxygen results in relatively lower conversions, but, due to the fact that the unreacted methallyl amine is readily recoverable, the yield is not materially affected. It is seen that, although it is generally preferable to employ oxygen and the amine in substantially equimolecular amounts, higher or lower ratios of these substances may also be used without departing from the scope of the present invention.

Although air or similar oxygen-containing gases may be employed as the source of oxygen, the use of such gases is not always advantageous. For example, in the conversion of relatively low boiling amines into the corresponding nitriles, the use of air and the like entails certain operating difficulties since the recovery of such low boiling nitriles from nitrogen or the like is somewhat cumbersome, although possible. Since the use of vaporous mixtures containing relatively high concentrations of the amine or amines usually tends to effect undesirable side-reactions, it is generally preferable to employ mixtures having the amines in lower concentrations. However, since it is also undesirable to use oxygen in excessive amounts (due to a possible excessive oxidation of the amine), it is advantageous to employ diluents which are inert to the reactants and reaction products at the operating conditions. As such, reference may be made to steam, nitrogen, carbon dioxide, etc. When pure oxygen is employed, the use of steam as the diluent is advantageous because of the relative simplicity of recovering the nitrile from the reaction mixture. This is due to the fact that water is a by-product of the oxidation reaction being formed by the reaction of the added oxygen with the hydrogen atoms liberated during the conversion of the amine to the corresponding nitrile. Therefore, by using steam as the diluent, the reaction mixture resulting from the oxidation reaction consists primarily of unreacted amine, water and the nitrile. The fractional separation of such mixture into its constituents is a relatively simple matter.

The degree of dilution of the amine-oxygen mixture may vary with relatively wide limits. The use of the inert diluent in excessive amounts, however, is undesirable since it requires the heating of large volumes of the diluted mixture to obtain relatively small amounts of the desired nitriles. Such a procedure, furthermore, necessitates the use of cumbersome equipment. Generally speaking, the use of diluents in such amounts that the volumetric concentration of the unsaturated amine in the mixture is between about 20% and 40%, and preferably in the neighborhood of about 30%, has given very satisfactory results both from the standpoint of economy and of yields of the desired nitrile.

In operation, according to the present process, the amine-oxygen mixture, whether diluted with an inert diluent, such as steam, or not, is passed in the vapor phase and preferably continuously over the stationary catalyst at a predetermined space velocity and while maintaining the desired or optimum temperature in the reaction zone. The exit vapors may then be treated in any known manner to recover the resulting nitrile, the specific method for such separation depending in part on the reactants used, specific diluent employed, etc. For example, the exit vapors may be passed into a fractionating column wherein the unreacted amine may be separated. The water formed as a by-product of the oxidation reaction may be separated from the nitrile by any suitable method, such as fractionation, stratification, use of drying agents, etc. A highly suitable method of recovering unsaturated nitriles from the reaction products resulting from the catalytic oxidation of allyl type amines consists in first converting the unreacted amine into the corresponding salt as by treatment with an acid, such as hydrochloric acid, subjecting the reaction mixture to distillation to recover the unsaturated nitriles as a constant boiling mixture with water, and then separating the nitriles from the water. The bottom fraction from the first distillation may be treated with a basic compound (e. g. caustic soda) to liberate the amine which can then be recovered by distillation, and recycled back for further catalytic oxidation in accordance with the present process.

The process may be generally executed at atmospheric or higher pressures, although sub-atmospheric pressures may also be resorted to, particularly during the catalytic oxidation of some unsaturated amines which might decompose or polymerize, or which may readily yield polymerizable or decomposable products at reaction temperatures desired for optimum production of the corresponding nitriles. In fact, from the above disclosure, it will be evident to those skilled in the art that the specific operating conditions, such as space velocities, pressures, temperatures, etc., may be varied within more or less wide limits within the scope of the invention depending on the specific reactants and catalyst employed, and the degree of dilution of the amine and oxygen in the mixture conveyed into the reaction zone. It is also seen that the present process provides a batch, intermittent or continuous mode of operation whereby amines, and particularly unsaturated allyl type amines, may be efficiently converted to the corresponding nitriles, such as the nitriles of the acrylo type.

The following examples are illustrative of the present invention and of the preferred methods of execution thereof, it being understood, however, that these examples are not intended to limit the invention which is co-extensive in scope with the appended claims.

Example I

A 40% aqueous solution of primary methallyl amine was vaporized at a temperature of between about 180° C. and 200° C., and was then, after commingling with air in such a ratio that the mol ratio of the amine to the oxygen of the ratio was about 1 to 0.80, conveyed through a glass reactor containing a silver screen catalyst. The reaction tube was maintained at a temperature of about 570° C. The rate of feed was equal to about 0.71 gram of methallyl amine and about 0.034 cubic foot of air per minute. During the operation (which lasted about 90 minutes) a total of 0.902 mol, or about 51.5 grams of the primary amine was thus passed over the catalyst.

The reaction product, after condensation, was neutralized to methyl red with concentrated hydrochloric acid to convert the unreacted primary methallyl amine into a neutral salt. The mixture was then subjected to distillation to recover an overhead fraction comprising a constant boiling mixture of water and the methacrylonitrile

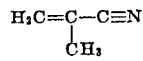

this azeotrope boiling at between about 76.6° and 76.8° C. An alkali was added to the bottom fraction remaining after this distillation, thus liberating the unreacted primary methallyl amine, which was then readily recovered by distillation. The reaction product thus separated and analyzed showed a 56.3 mol per cent conversion of primary methallyl amine to acrylonitrile. The recovered unreacted amine, which comprised about 25.6 mol per cent of the methallyl amine employed, was re-utilized by passage over the same catalyst. The per pass yield of methacrylonitrile was equal to about 75.8% as based on the consumed methallyl amine.

Example II

A 30% aqueous solution of methallyl amine was vaporized and commingled with pure oxygen in a mol ratio of about 1 to 0.83. This mixture was then conveyed through a small steel reactor containing silver chips. The rate of throughput of the methallyl amine was equal to about 0.585 gram per minute, approximately 0.0061 cu. ft. per minute of oxygen being thus conducted therewith through the reactor maintained at a temperature of about 500° C. The reaction was continued for about 493 minutes during which time about 4.07 mols of methallyl amine were thus treated.

The reaction product, upon treatment according to the process described in Example I, showed a 76.0 mol per cent conversion of methallyl amine to methacrylonitrile, with 14.9 mol per cent of the primary material recovered as unreacted methallyl amine. The yield of methacrylonitrile was 89.4%.

Example III

Primary methallyl amine was subjected to catalytic oxidation with pure oxygen in the same manner and in the same reactor as described in Example II, with the exception that a 20% aqueous solution of the amine was employed and the ratio of the methallyl amine to oxygen was maintained at about 1 to 1.03.

An analysis of the reaction product showed a 76.9 mol per cent conversion to methacrylonitrile, with about 9.8 mol per cent of the amine recovered as unreacted methallyl amine. The yield, based on the consumed amine, was therefore equal to about 85.2%.

Example IV

A 30% aqueous solution of methallyl amine was vaporized and commingled with oxygen in a mol ratio of 1 to 0.89. This mixture was then further diluted with carbon dioxide so that about 38.9 grams of the amine, about 0.432 cu. ft. of oxygen and 0.108 cu. ft. of carbon dioxide were conveyed per hour through a steel reactor. The catalyst in this case consisted of silver mirrors disposed on silicon carbide. The reaction was effected at a temperature of about 500° C., and continued for about 7 hours during which time a total of about 3.9 mols of primary methallyl amine were thus treated.

The reaction product showed a 72.0 mol per cent conversion of the unsaturated amine to methacrylonitrile, with about 17.9 mol per cent of the primary material recovered as unreacted amine. The yield was thus equal to about 87.9%.

*Example V*

A 30% aqueous solution of allyl amine was vaporized and, after commingling with oxygen in a mol ratio of about 1 to 1.05, was conveyed through a reactor maintained at a temperature of about 500° C. and containing an oxidation catalyst comprising silver mirrors on silicon carbide. The rate of throughput was equal to about 0.638 gram of allyl amine and about 0.0104 cu. ft. of oxygen per minute. During the reaction, which continued for about 100 minutes, a total of about 1.12 mols of primary allyl amine were thus treated.

The reaction product, which did not contain any unreacted allyl amine, showed a yield of acrylonitrile equal to about 81.2%.

*Example VI*

Primary allyl amine was subjected to the same treatment and under substantially identical conditions as those described in Example V. However, in this case the vaporous mixture conveyed through the reactor was further diluted by commingling with carbon dioxide which was employed in such a quantity that its rate of throughput was equal to about 0.003 cu. ft. per minute. This run was continued for about 6 hours during which period approximately 4.38 mols of allyl amine were conveyed over the silver catalyst in the reactor.

An analysis of the reaction product showed that about 2 mol per cent of the amine were recovered in an unreacted state, while about 87.0 mol per cent of the allyl amine were converted to acrylonitrile, the yield of the latter therefore being equal to 88.8% as calculated on the amine consumed in the reaction.

*Example VII*

A 30% aqueous solution of primary allyl amine was vaporized and then commingled with air in such an amount that the mol ratio of the amine to oxygen was equal to about 1 to 1.11. This vaporous mixture was then conveyed through a reactor heated to about 500° C. and containing a catalyst comprising silver mirrors deposited on silicon carbide. The hourly rate of throughput was equal to about 37.5 grams of the amine and about 3 cu. ft. of air. A total of 1.1 mols of the primary allyl amine was thus treated. The yield of acrylonitrile was equal to about 86.5%.

*Example VIII*

An aqueous solution containing 0.352 mol per cent of primary methallyl amine and 0.106 mol per cent of secondary methallyl amine was vaporized and commingled with oxygen so that the vaporous mixture contained substantially equimolecular amounts of the amines and of the oxygen. The mixture was then conveyed through a reactor maintained at a temperature of about 500° C. and containing a silver oxidation catalyst. The rate of throughput was such that about 97.2 grams, i. e. about 0.446 mol of the amines were passed through the reactor per hour. The conversion to methacrylonitrile was 60.2% with approximately 11.1% of the primary amine and about 5.7% of the secondary amine recovered in an unreacted state. The yield was therefore equal to 72.5% as based on the amines consumed.

Under somewhat similar conditions it was possible to obtain methacrylonitrile from the secondary methallyl amine solutions which did not contain any primary methallyl amine.

Although the above examples were directed specifically to the production of acrylonitrile and methacrylonitrile by the treatment of allyl amine and methallyl amine, respectively, it is to be understood that other amines of the above-defined class, whether saturated or not, may be converted to the corresponding nitriles by subjecting them to the catalytic oxidation according to the process of the present invention. Also, instead of employing oxygen or an oxygen-containing gas as the hydrogen acceptor, it is possible to employ other compounds, preferably organic compounds, which readily oxidize the amines under the defined operating conditions, while simultaneously acting as oxygen acceptors. As examples of this group of compounds, references may be made to ketones, such as acetone and the like, and certain esters. In the case of employing acetone, the reaction mixture resulting from the catalytic oxidation contains isopropyl alcohol instead of the water which is formed by the reaction of free oxygen with the hydrogen released in the conversion of the amines to the corresponding nitriles.

We claim as our invention:

1. A process for the production of nitriles which comprises commingling substantially equimolecular amounts of allyl amine and oxygen with an inert diluent in such an amount that the concentration of the allyl amine is between about 20% and 40% of the mixture, and conveying said mixture in a vaporous state in contact with a silver metal catalyst at a temperature of between about 500° C. and 525° C., thereby converting the allyl amine into acryonitrile.

2. A process for the production of acrylonitrile which comprises reacting a vaporous mixture containing substantially equimolecular amounts of oxygen and of allyl amine in the presence of a silver metal catalyst at a temperature of between about 500° C. and 525° C.

3. A process for the production of acrylonitrile which comprises reacting a vaporous mixture containing oxygen and allyl amine, in the presence of a silver metal catalyst at a temperature of between about 450° C. and 600° C.

4. A process for the production of methacryonitrile which comprises reacting methallyl amine with oxygen, in the presence of a silver metal catalyst at a temperature of between about 450° C. and 600° C.

5. A process for the production of nitriles which comprises commingling substantially equimolecular amounts of oxygen and of an amine containing an allyl group having two hydrogen atoms on the carbon atom directly attached to the nitrogen atom, with an inert diluent, whereby the amine concentration in the mixture is between about 20% and 40%, and subjecting said mixture in a vapor state, at a temperature of between about 450° C. and 600° C., to the action of an oxidizing catalyst essentially comprising silver metal.

6. A process for the production of nitriles which comprises commingling water with substantially equimolecular amounts of oxygen and of an amine containing an allyl group having two hydrogen atoms on the carbon atom directly attached to the nitrogen atom, and subjecting said mixture in a vapor state to the action of an oxidizing catalyst essentially comprising silver metal at a temperature of between about 450° C. and 600° C., thereby converting the amine into a nitrile.

7. A process for the production of nitriles which comprises reacting oxygen with an amine containing an allyl group having two hydrogen atoms on the carbon atom directly attached to the nitrogen atom, in the presence of an oxidizing catalyst essentially comprising silver metal and at a temperature of between about 450° C. and 600° C.

8. A process for the production of nitriles which comprises reacting an amine containing an olefinic group having two hydrogen atoms on the carbon atom directly attached to the nitrogen atom, with oxygen in the presence of an oxidizing catalyst essentially comprising silver metal and at a temperature of between about 450° C. and 600° C.

9. A process for the production of nitriles which comprises reacting an amine having at least one methylene group directly attached by a single bond to the nitrogen atom, with oxygen in the presence of an oxidizing catalyst essentially comprising silver metal, and at a temperature greater than 450° C., but below that at which substantial decomposition of the formed nitrile occurs.

10. A process for the production of nitriles which comprises reacting an amine containing an allyl group having two hydrogen atoms on the carbon atom directly attached to the nitrogen atom, with oxygen in the presence of an oxidizing catalyst and at a temperature of between about 450° C. and 600° C.

11. A process for the production of nitriles which comprises reacting an amine containing an olefinic group having two hydrogen atoms on the carbon atom directly attached to the nitrogen atom, with oxygen in the presence of an oxidizing catalyst containing a metal of the third period of the periodic table, and effecting the reaction at a temperature of between about 450° C. and the temperature at which substantial decomposition of the formed nitrile occurs.

12. A process for the production of nitriles which comprises reacting an amine having at least one methylene group directly attached by a single bond to the nitrogen atom, with oxygen in the presence of an oxidizing catalyst containing a metal of the third period of the periodic table, and effecting the reaction at a temperature of between about 450° C. and the temperature at which substantial decomposition of the formed nitrile occurs.

13. A process for the production of nitriles which comprises reacting substantially equimolecular amounts of oxygen and of an amine containing an allyl group having two hydrogen atoms on the carbon atom directly attached to the nitrogen atom, in the presence of an oxidizing catalyst and at a temperature of between about 450° C. and 600° C.

14. The process according to claim 13, wherein the reaction is effected in the presence of an inert vaporous substance employed in such an amount that the amine concentration in the reaction mixture is between about 20% and 40%.

15. A process for the production of nitriles which comprises reacting substantially equimolecular amounts of oxygen and of an amine containing an olefinic group having two hydrogen atoms on the carbon atom directly attached to the nitrogen atom, in the presence of an oxidizing catalyst and at temperature greater than 450° C. but below that at which substantial decomposition of the formed nitrile occurs.

16. A process for the production of nitriles which comprises reacting substantially equimolecular amounts of oxygen and of an amine having at least one methylene group directly attached by a single bond to the nitrogen atom, in the presence of an oxidizing catalyst and at a temperature greater than 450° C. but below that at which substantial decomposition of the formed nitrile occurs.

17. A process for the production of nitriles which comprises reacting an amine containing an allyl group having two hydrogen atoms on the carbon atom directly attached to the nitrogen atom, with oxygen in the presence of an oxidizing catalyst and at a temperature of between about 450° C. and 600° C.

18. A process for the production of nitriles which comprises reacting an amine containing an olefinic group having two hydrogen atoms on the carbon atom directly attached to the nitrogen atom, with oxygen in the presence of an oxidizing catalyst and at a temperature of between about 450° C. and 600° C.

19. A process for the production of nitriles which comprises reacting a primary amine having at least one methylene group directly attached by a single bond to the nitrogen atom, with oxygen in the presence of an oxidizing catalyst and at a temperature greater than 450° C. but below that at which substantial decomposition of the formed nitrile occurs.

KENNETH E. MARPLE.
THEODORE W. EVANS.
BERT BORDERS.